United States Patent [19]
Yamaoka et al.

[11] Patent Number: 5,293,969
[45] Date of Patent: Mar. 15, 1994

[54] ELECTROMAGNETIC SUSPENSION DEVICE

[75] Inventors: Fumiyuki Yamaoka; Mitsuo Sasaki, both of Kanagawa, Japan

[73] Assignee: Atsugi Unisia Corporation, Atsugi, Japan

[21] Appl. No.: 831,811

[22] Filed: Feb. 6, 1992

[30] Foreign Application Priority Data

Feb. 14, 1991 [JP] Japan ................. 3-020630
Feb. 27, 1991 [JP] Japan ................. 3-031201

[51] Int. Cl.$^5$ ............................................ B60G 17/00
[52] U.S. Cl. ............................ 188/299; 188/267; 188/314; 188/322.19; 188/322.22
[58] Field of Search ............... 188/267, 299, 322.11, 188/322.14, 322.19, 322.22, 314, 315; 280/709; 267/217, 221, 195

[56] References Cited

U.S. PATENT DOCUMENTS

| | | | |
|---|---|---|---|
| 2,025,199 | 12/1935 | Funston | 188/315 |
| 4,527,676 | 7/1985 | Emura et al. | 188/299 |
| 4,749,070 | 6/1988 | Moser et al. | 188/299 |
| 4,949,573 | 8/1990 | Wolfe | 188/299 X |
| 4,969,662 | 11/1990 | Stuart | 280/707 |
| 5,070,970 | 12/1991 | Johnston et al. | 188/315 |
| 5,158,161 | 10/1992 | Yamaoka et al. | 188/322.14 X |

FOREIGN PATENT DOCUMENTS

| | | | |
|---|---|---|---|
| 391066 | 10/1990 | European Pat. Off. | 188/267 |
| 2551516 | 5/1977 | Fed. Rep. of Germany | 188/314 |
| 197417 | 10/1985 | Japan | 188/322.14 |
| 251539 | 11/1987 | Japan | 188/267 |
| 2-37016 | 5/1989 | Japan . | |
| 1511411 | 5/1978 | United Kingdom | 188/267 |
| 2241044 | 8/1991 | United Kingdom | 188/299 |

Primary Examiner—Mark T. Le
Attorney, Agent, or Firm—Bachman & LaPointe

[57] ABSTRACT

An electromagnetic suspension device for use between a vehicle body and a road wheel is disclosed, which comprises a body-connected structure connected to the vehicle body to move therewith and a wheel-connected structure connected to the road wheel to move therewith. The body-connected and wheel-connected structures are arranged to carry out a relative movement therebetween. An electromagnetic actuator is associated with the body-connected and wheel-connected structures in order to electromagnetically control the relative movement in accordance with electric power applied thereto. A hydraulic damper is arranged in parallel with the electromagnetic actuator between the body-connected structure and the wheel-connected structure to produce a damping force in accordance with the relative movement.

11 Claims, 6 Drawing Sheets

ELECTROMAGNETIC SUSPENSION DEVICE

BACKGROUND OF THE INVENTION

1. Field of the Invention

The present invention relates in general to suspension devices, and more particularly to suspension devices of electromagnetically controlled type.

2. Description of the Prior Art

In order to clarify the task of the present invention, one conventional suspension device of the above-mentioned type (which will be referred to as "electromagnetic suspension device" hereinafter) will be briefly described, which is disclosed in Japanese Patent First Provisional Publication 2-37016 as a suspension unit for a motor vehicle.

The electromagnetic suspension device shown in the publication comprises generally an outer tube which is connected to a vehicle body and a rod which is connected to a road wheel. The rod has at its upper end a piston which is axially movably disposed in the outer tube. A coiled spring is disposed between the vehicle body and the road wheel, concentrically surrounding the rod. A permanent magnet is mounted to the upper portion of the rod and a coil is disposed on an inner surface of the outer tube in a manner to spacedly surround the permanent magnet. By applying current to the coil, there is produced a driving force in the direction of the axis of the coil. Thus, by controlling the flowing direction and intensity of the current, it becomes possible to maintain the height of the vehicle.

However, due to its inherent construction, the electromagnetic suspension device of this type has a limit in absorbing shocks applied thereto. In fact, the control of the shock absorbing is effected by only the driving force produced by the coil. Thus, if an abnormally big impact force is supplied to the suspension device during running of the vehicle, it tends to occur that the device is broken. Furthermore, since the needed driving force is produced by the current applied to the coil, electric power consumption is excessive thereby deteriorating the fuel consumption of the vehicle.

SUMMARY OF THE INVENTION

It is therefore an object of the present invention to provide an electromagnetic suspension device which is free of the above-mentioned drawbacks.

According to the present invention, there is provided an electromagnetic suspension device in which an electromagnetic actuator and a hydraulic damper are arranged in parallel with each other.

According to the present invention, there is provided an electromagnetic suspension device for use between a vehicle body and a road wheel. The device comprises a body-connected structure connected to the vehicle body to move therewith; a wheel-connected structure connected to the road wheel to move therewith, the body-connected and wheel-connected structures being arranged to carry out a relative movement therebetween; an electromagnetic actuator associated with the body-connected and wheel-connected structures to electromagnetically control the relative movement in accordance with electric power applied thereto; and a hydraulic damper arranged in parallel with the electromagnetic actuator between the body-connected structure and the wheel-connected structure to produce a damping force in accordance with the relative movement.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
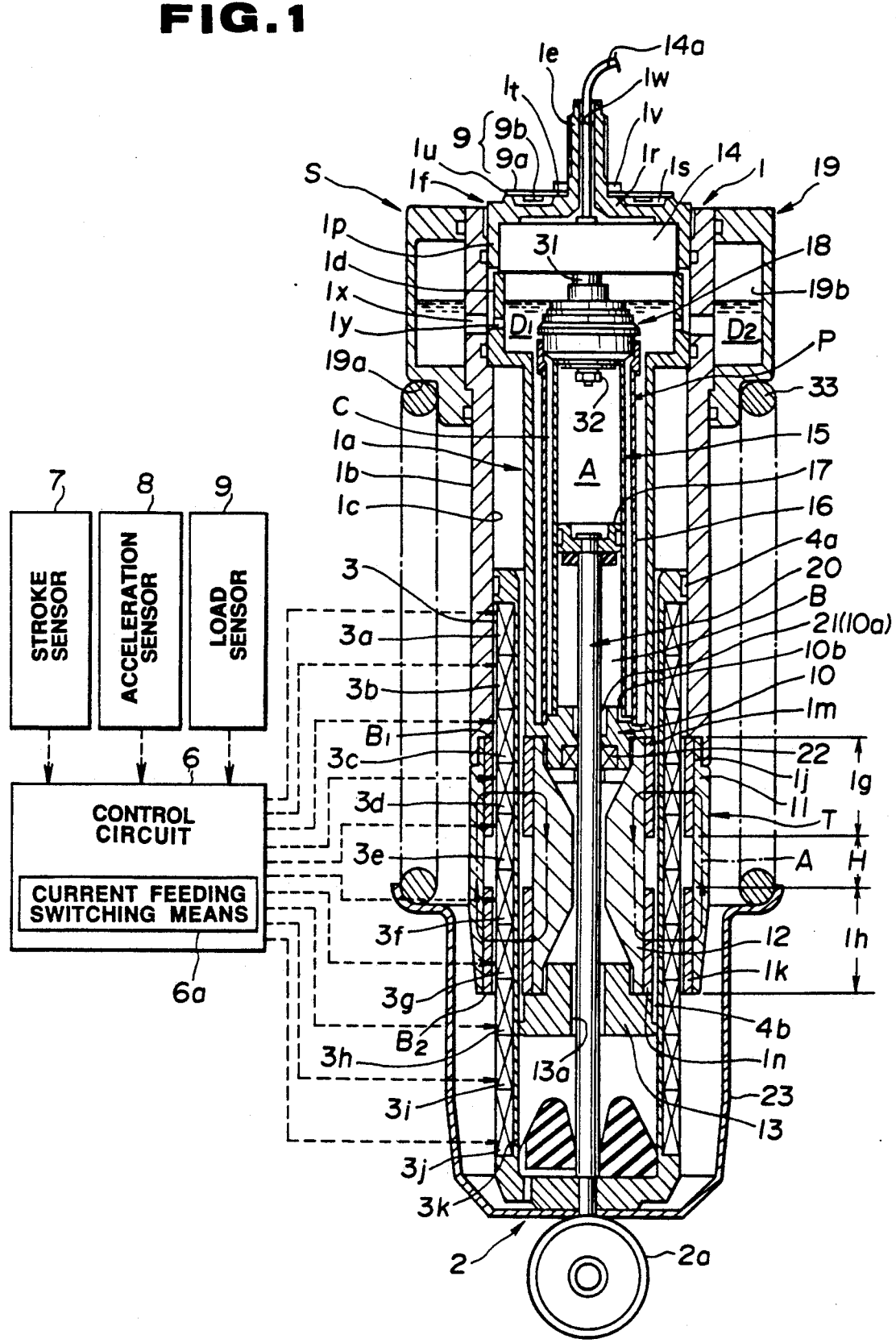
FIG. 1 is a sectional view of an electromagnetic suspension device which is a first embodiment of the present invention.

Referring to FIGS. 1 to 6, particularly FIG. 1 of the drawings, there is shown an electromagnetic suspension device, which is a first embodiment of the present invention.

In FIG. 1, designated by reference S is a suspension unit which has both a body-connected structure 1 which is to be connected to the vehicle body and a wheel-connected structure 2 which is to be connected to the road wheel.

As shown, the body-connected structure 1 comprises inner and outer tubes 1a and 1b which are coaxially arranged to define therebetween a cylindrical space 1c. The inner tube 1a has a larger diameter upper portion 1d tightly fitted into the outer tube 1b.

Tightly disposed about an upper portion of the outer tube 1b is an upper spring seat 19 whose construction will be described in detail hereinafter.

The outer tube 1b has an open upper end to which a lid 1f is detachably fitted to close the same. The lid 1f comprises an annular portion 1p and a lid portion 1r, the annular portion 1p being threadedly engaged with the inner surface of the outer tube 1b. The lid portion 1r has a stud 1e which is to be connected to the vehicle body. The lid portion 1r is formed at its upper surface with an annular groove 1s by which inner and outer annular banks 1t and 1u are defined. A load sensor 9 is mounted on the inner and outer annular banks 1t and 1u. The load sensor 9 comprises a sensor body 9a shaped like an annular shape and a strain gauge 9b. Inner and outer peripheral portions of the sensor body 9a are disposed on the inner and outer annular banks 1t and 1u of the lid 1f, and the inner peripheral portion of the sensor body 9a is tightly attached to the inner bank 1t by means of a clip plate 1v tightly disposed about the stud 1e. Thus, any flexure of the sensor body 9a caused by the flexure of the lid portion 1r is detected by the strain gauge 9b, so that a load applied to the suspension unit S can be detected. Within the annular portion 1p of the lid 1f, there is tightly installed a step motor 14 from which a wire harness 14a extends to the outside through a bore 1w formed in the stud 1e. The wire harness 14a leads to a control circuit 6 which will be described hereinafter.

To lower ends of the inner and outer tubes 1a and 1b, there are respectively secured magnetic inner and outer tubes 12 and 11, each being made of ferromagnetic material. It is to be noted that among the members which constitute the body-connected structure 1, members other than the magnetic inner and outer tubes 12 and 11 are made of a non-magnetic material. The magnetic inner tube 12 has an open lower end covered by a guide member 13. The guide member 13 has a center bore 13a formed therethrough.

On a cylindrical inner surface of the magnetic outer tube 11, there are disposed upper and lower outer permanent magnets 1j and 1k which are coaxially spaced by a distance of H. While, on a cylindrical outer surface of the magnetic inner tube 12, there are disposed upper and lower inner permanent magnets 1m and 1n which are coaxially spaced by the distance of H. With this, between the upper outer permanent magnet 1j and the upper inner permanent magnet 1m and between the lower outer permanent magnet 1k and the lower inner permanent magnet 1n, there are respectively constituted upper and lower magnetic field producing portions 1g and 1h, each portion 1g or 1h being thus positioned within the cylindrical space 1c between the inner and outer tubes 1a and 1b. The permanent magnets 1j, 1k, 1m and 1n are so arranged as to form a magnetic path A illustrated by a phantom line in FIG. 1 and to cause the upper and lower magnetic field producing portions 1g and 1h to produce respective magnetic fields B1 and B2 in which the magnetic flux extends in a radial direction in the cylindrical space 1c. That is, in the illustrated embodiment, the upper outer and inner permanent magnets 1j and 1m have N-pole at the inner sides thereof, while the lower outer and inner permanent magnets 1k and 1n have S-pole at the inner sides thereof.

The wheel-connected structure 2 is shaped like a tube having a bottom. To the bottom, there is connected a lower end of a piston rod 20. The bottom further has a cylindrical lower spring seat 23 and a mounting eye 2a which is to be connected to the road wheel. Between the lower spring seat 23 and the aforementioned upper spring seat 19, there is disposed a coiled suspension spring 33. The tubular portion of the wheel-connected structure 2 is axially movably disposed in the cylindrical space 1c possessed by the above-mentioned body-connected structure 1. A coil 3 is coaxially disposed about the tubular portion of the structure 2 leaving a small cylindrical clearance between it and the outer tube 1b of the body-connected structure 1.

The coil 3 consists of ten coil pieces 3a to 3j which are coaxially aligned. The coil pieces 3a to 3j are wound on respective bobbins 3k. Each coil piece has an axial length which is smaller than the distance H between the upper and lower outer permanent magnets 1j and 1k (or between the upper and lower inner permanent magnets 1m and 1n). Around an upper outer surface of the tubular portion of the wheel-connected structure 2 and an outer surface of the guide member 13, there are disposed respective dry bearings 4a and 4b.

The coil 3 is connected to the control circuit 6. As is seen from FIG. 1, the coil pieces 3a to 3j are connected in series at respective terminals. That is, every two neighboring coil pieces have a common terminal to which trailing and leading wire ends of them are connected, and the uppermost and the lowermost coil pieces have independent terminals to which leading and trailing wire ends of them are connected, as is seen from FIG. 1. From each terminal, there extends a wire to the control circuit 6, so that each coil piece can be selectively energized and deenergized by the control circuit 6. The control circuit 6 is so arranged to connect a variable resistor to the coil 3 upon the energization and deenergization.

That is, when, with the coil 3 being deenergized, the suspension unit S strokes, the coil 3 is forced to move in a direction to cross the magnetic fields B1 and B2 of the upper and lower magnetic field producing portions 1g and 1h. With this, the coil 3 produces an induction current in proportion to the relative speed of the coil. The current thus produced is consumed by the variable resistor and thus the kinetic energy is reduced and thus a damping force is produced.

Figure 5:
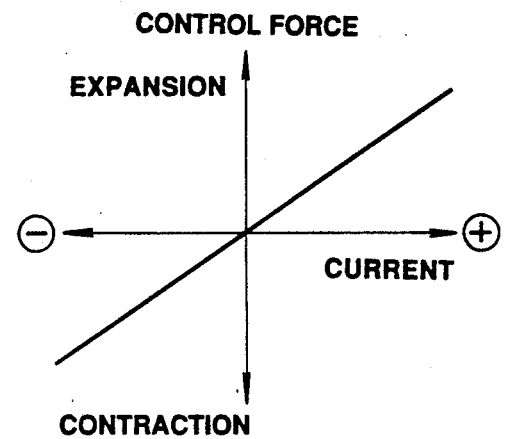
FIG. 5 is a graph showing the characteristic of a control force produced by an electromagnetic actuator.

While, when, with the coil 3 being energized, the coil 3 is moved in response to the stroke of the suspension unit S, the current is forced to flow in a direction to cross the magnetic fields B1 and B2 of the upper and lower magnetic field producing portions 1g and 1h. Thus, in accordance with the direction and intensity of the current, there is produced a driving force in a direction to expand or contract the suspension unit S. That is, as shown in FIG. 5, a control force is produced which is in proportion to the intensity of the current applied to the coil 3. Thus, the coil 3 and the permanent magnets 1j, 1k, 1m and 1n constitute an electromagnetic actuator T.

The control circuit 6 has a current feeding switching means 6a which, based on an information signal applied thereto from a stroke sensor 7, selectively energizes and deenergizes each coil piece 3a to 3j and changes the direction of the current in accordance with the stroke position of the suspension unit S. That is, the current feeding switching means 6a carries out such a control as to feed the current to only the coil pieces which are located within the magnetic fields B1 and B2. Furthermore, because the directions of the magnetic fluxes appearing in the magnetic fields B1 and B2 extend in opposed directions, the switching means 6a functions to square the directions of the driving forces produced in the magnetic field producing portions 1g and 1h. That is, for achieving this, the current feeding to the coil pieces 3a to 3j is so made that the direction of current in the coil pieces located within the magnetic field B1 of the upper magnetic field producing portion 1g is opposite to the direction of current in the other coil pieces located within the other magnetic field B2 of the lower magnetic field producing portion 1h. Furthermore, the switching means 6a functions so that the direction of current fed to the coil pieces 3a to 3j is switched in accordance with the stoke position of the suspension unit S.

The stroke sensor 7 comprises Hall-effect sensors (not shown) mounted in the center of the respective bobbins 3k. In accordance with the magnetic flux of the magnetic field B1 or B2, each Hall-effect sensor changes its output voltage. Thus, by measuring the output voltage of each Hall-effect sensor, the position of each coil piece 3a to 3j relative to the magnetic field producing portion 1g or 1h is detected and thus the stroke position of the suspension unit S can be detected.

Within the inner tube 1a, there is mounted a hydraulic damper P. That is, within the inner tube 1a, there is coaxially disposed a cylindrical tube 15. Between the cylindrical tube 15 and the inner tube 1a, there is coaxially disposed an outer tube 16 defining an outside chamber C around the cylindrical tube 15. The tubes 15 and 16 have respective upper ends which support a damping force varying valve 18 installed in the larger diameter upper portion 1d of the above-mentioned inner tube 1a. The tubes 15 and 16 have further respective lower ends connected to a rod guide portion 10 which is integrally provided by a lower end of the inner tube 1a. Within the tubes 15 and 16, there is filled a liquid, such as oil or the like. Within the cylindrical tube 15, there is slidably and sealingly disposed a piston 17 by which the interior of the tube 15 is divided into upper and lower chambers A and B. Within the inner tube 1a including the larger diameter cylindrical portion 1d, there is formed a main reservoir chamber D1 which is bounded by the inner tube 1a, the dampling force varying valve 18 and the outer tube 16. The chamber D1 contains a given amount of liquid compressed by a pressurized gas. The rod guide 10 is formed with a passage 10b through which the lower chamber B and the outside chamber C are communicated.

The piston 17 is connected to an upper end of the piston rod 20 which extends through a rod passing bore 10a of the rod guide 10 into the interior of the cylindrical tube 15. In the rod passing bore 10a, there are installed a guide bush 21 and an oil seal 22 which are in contact with the outer surface of the piston rod 20.

The outer tube 1b has at its upper outer surface the upper spring seat 19 mounted thereto. The upper spring seat 19 is formed at its lower peripheral surface with an annular seat surface 19a, and at its inside portion facing the main reservoir chamber D1 with an annular groove 19b. The annular groove 19b and the outer surface of the outer tube 1b thus constitute a sub-reservoir chamber D2 in which a given amount of liquid is contained together with a pressurized gas. The sub-reservoir chamber D2 and the above-mentioned main reservoir chamber D1 are communicated with each other through passages 1x and 1y respectively formed in the outer tube 1b and the larger diameter cylindrical portion 1d.

Figure 2:
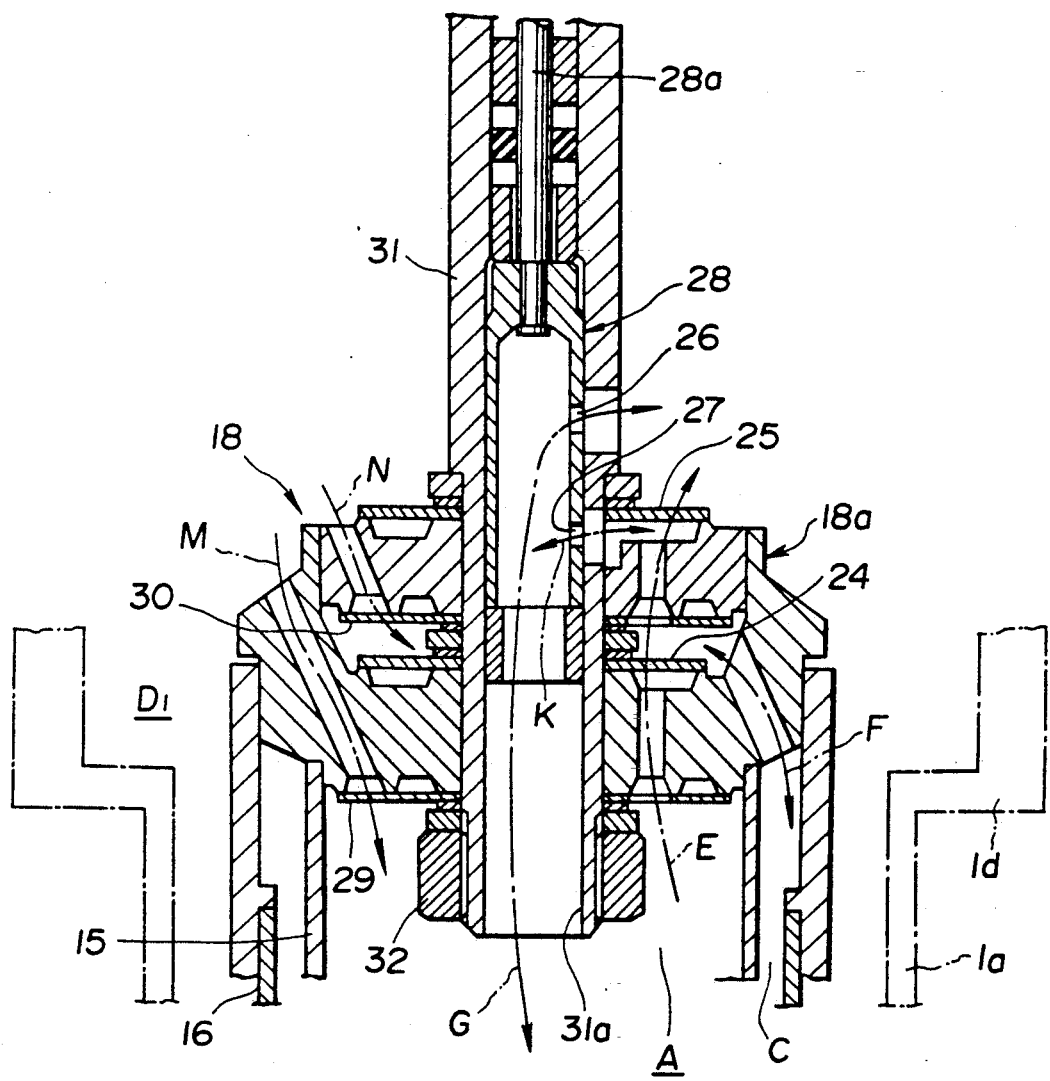
FIG. 2 is an enlarged sectional view of a portion of the suspension device of the first embodiment where a damping force varying valve is located.

In the following, the detail of the damping force varying valve 18 will be described with reference to FIG. 2.

As is seen from the drawing, the damping force varying valve 18 comprises a valve body 18a which has a first passage E through which the upper chamber A is communicated with the main reservoir chamber D1, a second passage F through which a middle portion of the first passage E is communicated with the outside chamber C, a first bypass passage G which communicates the upper chamber A with the main reservoir chamber D1 bypassing the first passage E, a second bypass passage K which communicates a middle portion of the first bypass passage G with a middle portion of the first passage E, a first check passage M which communicates the main reservoir chamber D1 with the upper chamber A, and a second check passage N which communicates the main reservoir chamber D1 with a middle portion of the second passage F. Within the first passage E, there are installed first and second damping valves 24 and 25, and within the -first and second bypass passages G and K, there are respectively arranged first and second orifices 26 and 27 which are provided by a control spool (viz., damping force varying means) 28. Within the first check passage M, there is installed a first check valve 29, while, within the second check passage N, there is installed a second check valve 30.

The valve body 18a is connected to a lower portion of a supporting pipe B1 by means of a nut 32. An upper end of this pipe B1 (see FIG. 1) is connected to the casing of the aforementioned step motor 14. The control spool 28 is rotatably received in a through bore 31a of the supporting pipe B1 and connected through a control rod 28a to an output shaft of the step motor 14, so that due to rotation of the control spool 28 driven by the step motor 14, the opening degree of the first and second orifices 26 and 27 is varied.

Referring back to FIG. 1, in accordance with information signals from the stroke sensor 7, an acceleration sensor 8 and the load sensor 9, the control circuit 6 controls the step motor 14. The acceleration sensor 8 is mounted on the vehicle body for detecting the vertical acceleration of the vehicle body. The vertical acceleration sensed is used for deriving a vertical speed of the vehicle body. The load sensor 9 senses a load applied to the suspension unit S. The load sensed is used for deriving the relative speed between the vehicle body and the road wheel.

In the following, operation of the above-mentioned first embodiment will be described.

In practical use, the suspension unit S is arranged between the vehicle body and each of the road wheels, and the control circuit 6 and the sensors 7, 8 and 9 are used for each suspension unit S.

Figure 3:
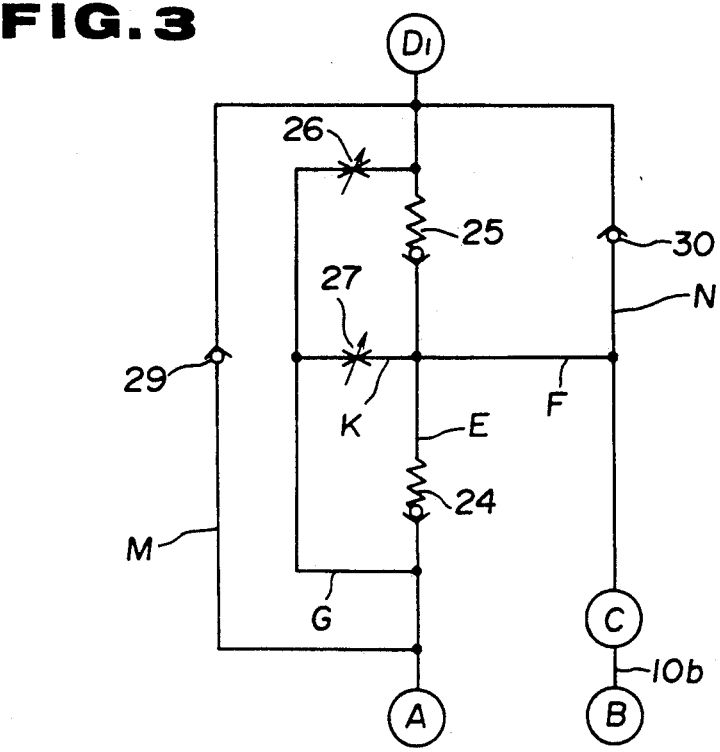
FIG. 3 is an electric circuit for a hydraulic damper installed in the suspension device of the first embodiment.
Figure 4:
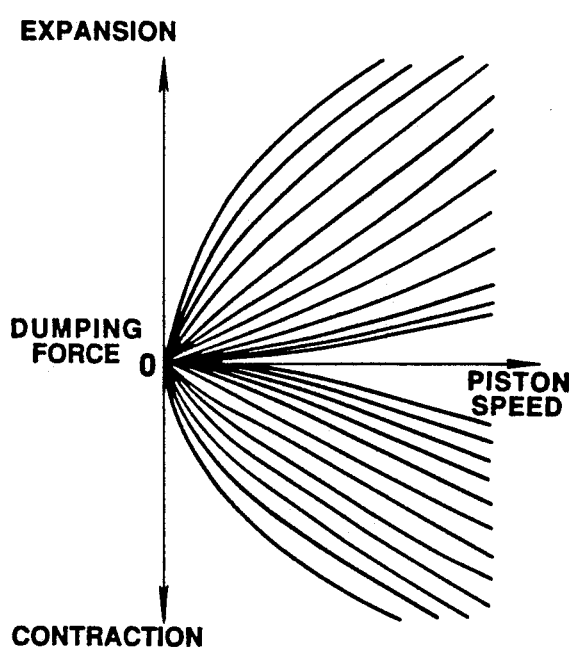
FIG. 4 is a graph showing the characteristic of the hydraulic damper.

First, operation of the hydraulic damper P P will be described with reference to FIG. 3.

Under contraction process of the suspension unit S, the upper chamber A is contracted and the lower chamber B is expanded. Accordingly, under this process, the fluid in the upper chamber A is forced to flow into the lower chamber B and the main reservoir chamber D1. Thus, the following three routes are available in this case.

(1) A route in which the fluid flows into the main reservoir chamber D1 through the first bypass passage G and the first orifice 26.

(2) A route in which the fluid flows into the outside chamber C through the first passage E, the first damping valve 24 and the second passage F, and thereafter the fluid in the chamber C flows into the lower chamber B through the lower passage 10b.

(3) A route in which the fluid flows through the first bypass passage G and flows into the second bypass passage K through the second orifice 27, and similar to the route of (2), the fluid flows through the second passage F into the outside chamber C and the lower chamber B.

Accordingly, at the first damping valve 24 or at both the orifices 26 and 27, there is produced a damping force. Selection of the routes (1), (2) and (3) depends on the opening degree of the orifices 26 and 27 and the characteristics of the first damping valve 24. When the orifices 26 and 27 increase their opening degree, a lower damping force characteristic is obtained, while, when they reduce their opening degree, a higher damping force characteristic is obtained, as is seen from the graph of FIG. 4.

Under expansion process of the suspension unit S, the lower chamber B is contracted and the upper chamber A is expanded. Accordingly, under this process, the fluid in the lower chamber B is forced to flow through the outside chamber C into the upper chamber A or the main reservoir chamber D1, and at the same time, the fluid in the main reservoir chamber D1 is forced to flow into the upper chamber A. Thus, the following three routes are available in this case.

(1) A route in which the fluid flows from the lower chamber B into the outside chamber C and the fluid flows therefrom to the main reservoir chamber D1 by opening the second damping valve 25 through the second passage F and the first passage E.

(2) A route in which similar to the route (1), the fluid flows through the second passage F and flows therefrom into the upper chamber A through the second passage K and the first passage G.

(3) A route in which the fluid flows from the main reservoir chamber D1 to the upper chamber A through the first check passage M.

Accordingly, at the second damping valve 25 or at the second orifice, there is produced a damping force. Selection of the routes (1), (2) and (3) depends on the opening degree of the second orifice 27 and the characteristics of the second damping valve 25. The damping force characteristic is varied as is seen from the graph of FIG. 4.

In the following, the operation of the electromagnetic actuator T will be described.

When it is needed to permit the electromagnetic actuator T to produce a damping force in accordance with the running condition of the vehicle, the coil pieces 3a to 3j are deenergized. In this condition, a damping force (control force) is produced in accordance with the relative speed between the body-connected structure 1 and the wheel-connected structure 2, that is, in proportion to the speed of the coil 3 which moves in the upper and lower magnetic field producing portions 1g and 1h. Thus, when the control for the damping force is carried out in this manner, it is unnecessary to feed current to the coil 3, and thus a damping force is obtained without consuming electric power.

When it is needed to permit the electromagnetic actuator T to generate a driving force in order to achieve a vehicle posture control or the like, the coil 3 is fed with a current in accordance with the vehicle condition represented by information signals issued from the sensors 7 to 9. That is, in accordance with the information signals from the sensors 7 to 9, the electromagnetic actuator T generate an upward or downward driving force (control force) in the direction of the axis of the suspension unit S. The direction and intensity of the driving force are varied in accordance with the direction of the current and intensity of the current applied to the actuator T. For example, by generating such driving force in a direction to cancel the change of the vehicle height, the vehicle height can be kept constant. Furthermore, by generating such driving force in a direction to cancel an external force inputted to the suspension unit S from the wheel-connected structure 2, the vehicle posture can be maintained constant.

Figure 6:
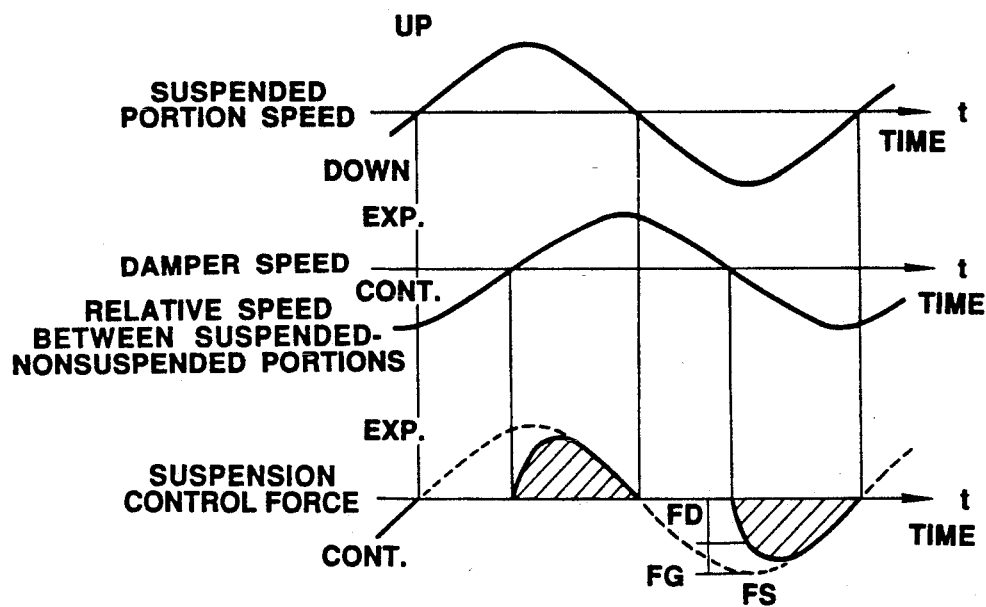
FIG. 6 is a graph showing the characteristic of the suspension device of the first embodiment when used as a skyhook damper.

FIG. 6 is a graph showing an example for controlling the control force (viz., driving force and/or damping force) produced by the first embodiment of the present invention. In the drawing, the curve illustrated by a broken line shows the characteristic possessed by an ideal sky-hook damper, and the parts illustrated by slant lines show the area in which the hydraulic damper P can produce a control force (damping force) "FD".

In order to achieve a suspension control identical to the ideal control of the sky-hook damper, a large control force "FS" (viz., FS=a x Vu) is necessary wherein "a" and "Vu" represent a proportional Constance and a suspended portion speed respectively. However, in the area in which the relative speed between the suspended portion and the nonsuspended portion is in agreement with the that of the suspension control force FS, the hydraulic damper P can produce the control force (damping force). Thus, in such area, the control force "FG" which is to be produced by the electromagnetic actuator is represented by "FG=FS−FD" and thus the electric power can be saved.

Figure 7:
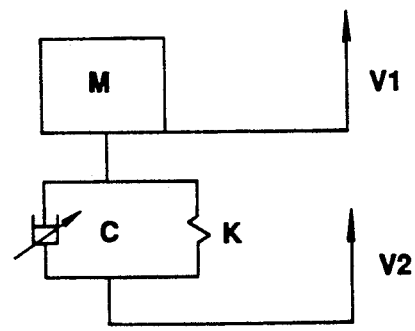
FIG. 7 is an illustration for explaining the skyhook theory.

The sky-hook theory is a theory in which in the vibration model of FIG. 7, only a suspended portion vibration is controlled by producing a control force "FS" (viz., FS=V1×C) against a suspended portion speed "V1" wherein "C" is a damping coefficient. In the drawing, designated by M is a mass and K is a spring constant.

As is described hereinabove, in the first embodiment of the present invention, the hydraulic damper P and the electromagnetic actuator T are arranged in parallel with each other. Thus, even when an abnormally big impact force is applied to the suspension device, the device is prevented from being broken. Furthermore, because of the above-mentioned reasons, electric power consumption of the electromagnetic actuator T can be reduced.

Furthermore, because of the unique arrangement of parts of the suspension device, it is no need of increasing the magnetic path A even in a case wherein a larger stroke is required by the suspension unit S. Accordingly, irrespective of the degree of the stroke, a sufficient control force is obtained.

Furthermore, since, in this embodiment, the power feeding is made to only some of the coil pieces 3a to 3j which are needed to produce the control force, electric power saving is obtained.

In the embodiment, as the stroke sensor 7 for sensing the stroke position of the suspension device S, a flux sensor such as the Hall-effect sensor is used. Thus, the stroke position of the suspension unit S can be detected without increasing the basic length of the suspension unit S. This induces a compact construction of the suspension device.

Although the above-mentioned embodiment is directed to an example wherein the body-connected structure has a double-walled construction, the wheel-connected structure may have such a double-walled construction. Although, in the described embodiment, the magnetic path is produced by both the upper and lower paired magnetic field producing portions, the magnetic path may be produced by only one pair of magnetic field producing portions. Furthermore, in place of the permanent magnets, electro-magnets may be used. Although, in the disclosed embodiment, the magnets and the coil are shaped cylindrical and coaxially arranged, the relative positioning therebetween may change at will. Furthermore, if desired, the number of turns of each coil piece may change at will.

Figure 8:
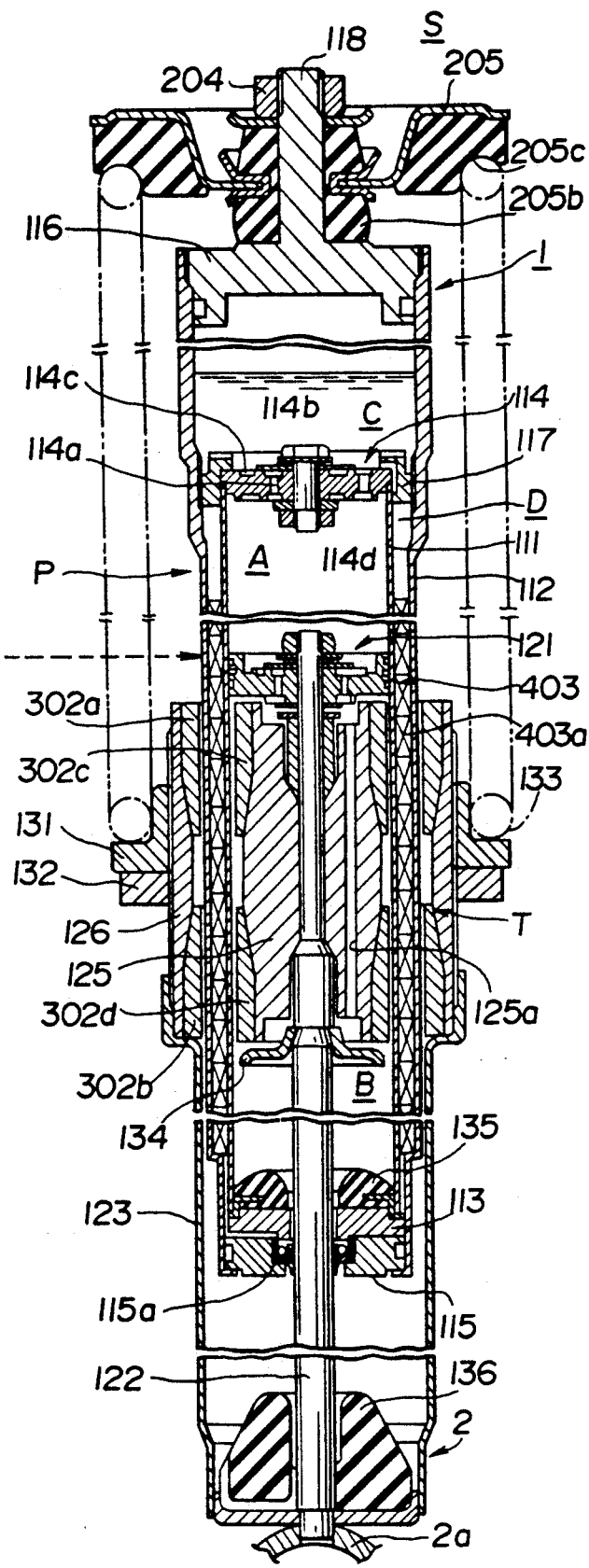
FIG. 8 is a view similar to FIG. 1, but showing a second embodiment of the present invention.
Figure 9:
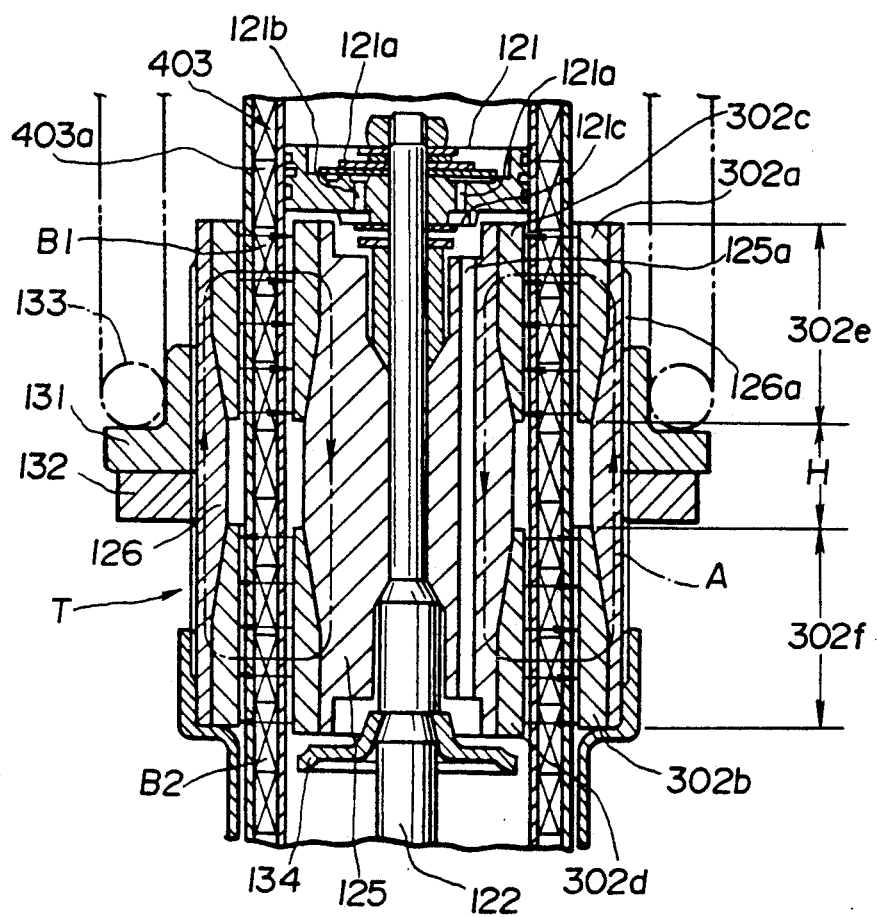
FIG. 9 is an enlarged sectional view of an essential portion of the suspension device of the second embodiment.

Referring to FIGS. 8 and 9, particularly, FIG. 8 of the drawings, there is shown an electromagnetic suspension device, which is a second embodiment of the present invention.

In FIG. 8, designated by reference S is a suspension unit which has both a body-connected structure 1 and a wheel-connected structure 2.

As is shown, the body-connected structure 1 has a double-walled cylindrical structure including a cylinder tube 111 and a reservoir tube 112. The cylinder tube 111 has at its lower end a guide member 113 connected thereto, and at an upper end a base member 114 connected thereto. Within the cylinder tube 111, there is contained a fluid such as oil or the like. Within the cylinder tube 111, there is slidably and sealingly disposed a piston 121 to define upper and lower chambers A and B. The piston 121 constitutes a part of the wheel-connected structure 2. The reservoir tube 112 is coaxially disposed about the cylinder tube 111 to define therebetween a cylindrical space D. The reservoir tube 112 has a lower open end tightly received on both the guide member 113 and a packing land 115 located below the guide member 113, the lower open end being-caulked. An upper open end of the reservoir tube 112 extends beyond the upper end of the cylinder tube 111 and has a top lid 116 screwed thereinto to close the same. With this, there is formed above the base member 114 a reservoir chamber C which contains a given amount of fluid with a gas under pressure. Within the middle part of the reservoir tube 112, there is installed an annular spacer 117 threadedly connected thereto. Within the annular spacer 117, there are tightly disposed the base member 114 and the upper end of the cylinder tube 111. The packing land 115 has an oil seal 115a mounted thereto.

The top lid 116 has at its upper center portion an upwardly projected stud 118 which is to be connected to the vehicle body. Through an upper insulator 205 mounted to the stud 118 through a nut 204, the body-connected structure 1 is connected to the vehicle body. The upper insulator 205 comprises an annular bracket 205a whose outer periphery is fixed to the vehicle body, and a rubber bush 205b which is fixed to a peripheral edge of a center bore of the bracket, 205a. The rubber bush 205b has a center bore into which the stud 118 of the top lid 116 is received, and the nut 204 is threadedly engaged with an upper end of the stud 118 to achieve an integral connection between the rubber bush 205b and the top lid 116. The bracket 205a has at its outer lower surface portion an annular rubber member welded thereto, the rubber member serving as an upper spring seat 205c.

The base member 114 is formed with first and second passages 114a and 114b through which the reservoir chamber C and the upper chamber A are communicated. The first passage 114a has at a portion exposed to the reservoir chamber C a damping valve 114c, and the second passage 114b has at a portion exposed to the upper chamber A a damping valve 114d.

As is well shown in FIG. 9, the piston 121 is formed with first and second passages 121a and 121b through which the upper and lower chambers A and B are communicated. The first passage 121a has at a portion exposed to the lower chamber B a damping valve 121c, and the second passage 121b has at a portion exposed to the upper chamber A a damping valve 121d.

When the suspension unit S is subjected to a stroke, fluid is forced to flow between the chambers A, B and C while being restricted by the damping valves 114c, 114d, 121c and 121d. Thus, a damping force is produced by the unit S.

In this embodiment, the cylinder tube 111, the outer tube 112, the base member 114, the piston 121 and a piston rod 122 for the piston 121 constitute a hydraulic damper P.

Referring back to FIG. 8, the wheel-connected structure 2 is equipped with the piston 121, the piston rod 122 connected to the piston 121, and an outer tube 123. The outer tube 123 is arranged to coaxially receive therein the above-mentioned reservoir tube 112 leaving a small cylindrical clearance therebetween. That is, the outer tube 123 is shaped cylindrical and has a circular bottom. The bottom has a lower end of the piston rod 122 connected thereto. To the lower end of the piston rod 122, there is fixed a mounting eye which is to be connected to the road wheel. Disposed about the piston rod 122 in the cylinder tube 111 is an inner magnetical cylindrical member 125 constructed of ferromagnetic material. Disposed about an upper portion of the outer tube 123 is an outer magnetical cylindrical member 126 constructed of ferromagnetic material. The inner magnetical cylindrical member 125 is formed with an axially extending passage 125a through which the upper and lower chambers A and B are communicated. Among members which constitute the wheel-connected structure 2, the members other than the inner and outer magnetical cylindrical members 125 and 126 are constructed of nonmagnetic material.

On an inner surface of the outer magnetical cylindrical member 126, there are disposed upper and lower outer permanent magnets 302a and 302b leaving a given space H (see FIG. 9) therebetween at a middle portion of the member 126. While, on an outer surface of the inner magnetical cylindrical member 125, there are disposed upper and lower inner permanent magnets 302c and 302d leaving the given space H therebetween at a middle portion of the member 125. Thus, between the upper outer permanent magnet 302a and the upper inner permanent magnet 302c and between the lower outer permanent magnet 302b and the lower inner permanent magnet 302d, there are respectively formed upper and lower magnetic field producing portions 302e and 302f (see FIG. 9).

The permanent magnets 302a, 302b, 302c and 302d are each constructed of radially equally spaced four pieces, and these magnets are so oriented that the magnetic fields of them put therebetween the body-connected structure 1 and extend in radial directions. In the disclosed embodiment, for allowing the magnetic fields of the upper and lower magnetic field producing portions 302e and 302f to extend in opposite directions, the upper outer permanent magnet 302a and the upper inner permanent magnet 302c have each N-pole at the inner side, and the lower outer permanent magnet 302b and the lower inner permanent magnet 302d have each S-pole at the inner side. Since the outer magnetical cylindrical member 126 and the inner magnetical cylindrical member 125 are constructed of ferromagnetic material, the permanent magnets 302a, 302b, 302c and 302d form magnetic paths shown by phantom lines A in FIG. 9. In the upper and lower magnetic field producing portions 302e and 302h, there are produced magnetic fields B1 and B2 which extend in radial but opposite directions.

As is shown in FIG. 9, the outer magnetical cylindrical member 126 has a threaded outer surface 126a with which a lower spring sheet 131 is threadedly engaged. Designated by numeral 132 is a lock nut 132 for tightly fixing the lower spring sheet 131 to the outer magnetical cylindrical member 126. Between the upper spring seat 205c and the lower spring seat 131, there is compressed a coil spring 133.

Within the cylindrical space D defined between the cylindrical tube 111 and the reservoir tube 112, there is tightly disposed a coil 403.

The coil 403 comprises a plurality of coil pieces 403a which are coaxially aligned along the axis of the cylinder tube 111. Each coil piece 403a has an axial length which is smaller than the distance H between the upper outer permanent magnet 302a (or upper inner permanent magnet 302c) and the lower outer permanent magnet 302b (or lower inner permanent magnet 302d).

The coil pieces 302a are respectively provided with Hall-effect sensors (not shown) which constitute a stroke sensor 7 (see FIG. 8). When moved together with the coil 302 in the upper and lower magnetic field producing portions 302e and 302f, each Hall-effect sensor reacts with the magnetic flux of the magnetic fields B1 and B2 changing the output voltage thereof. By measuring the output voltage, the position of each coil piece 403a relative to the magnetic field producing portions 302e and 302f, that is, the stroke position of the suspension unit S is detected.

As is shown in FIG. 8, the coil 403 is connected to a control circuit 6. Similar to the case of the aforementioned first embodiment, from each terminal provided between neighboring coil pieces 403a, there extends a wire (not shown) to the control circuit 6, so that each coil piece 403a can be selectively energized and deenergized by the control circuit 6. The control circuit 6 is so arranged as to connect a variable resistor to the coil 403 upon the energization and deenergization.

When, with the coil 403 being deenergized, the suspension unit S is subjected to a stroke, the coil 403 is forced to move in a direction to cross the magnetic fields B1 and B2 thereby generating an induction current in proportion to the moving speed of the coil 403 relative to the magnetic fields B1 and B2. The current thus generated is consumed by the variable resistor and thus the kinetic energy is reduced. Thus, a damping force is produced.

While, when the coil 403 is energized, the current flows in a direction to cross the magnetic fields B1 and B2 of both the magnetic field producing portions 302e and 302f. Thus, in accordance with the direction and intensity of the current applied, there is produced a driving force in the expansion or contraction direction of the suspension unit S. That is, there is produced a driving force which is in proportion to the intensity of the current applied to the coil 403. It is to be noted that in this specification, the driving force now mentioned and the control force mentioned hereinabove will be generically named as "control force".

As is described hereinabove, the coil 403 and the permanent magnets 302a, 302b, 302c and 302d constitute an electromagnetic actuator T.

The control circuit 6 has a current feeding switching means 6a which, based on an information signal applied thereto from the stroke sensor 7, selectively energizes and deenergizes each coil piece 403a and changes the direction of the current in accordance with the stroke position of the suspension unit S. That is, the current feeding switching means 6a carries out such a control as to feed the current to only the coil pieces 403a which are positioned within the magnetic fields B1 and B2. Furthermore, because the directions of the magnetic fluxes appearing in the magnetic fields B1 and B2 extend in opposed directions, the switching means 6a functions to square the directions of the driving forces produced in the magnetic field producing portions 302e and 302f.

That is, for achieving this, the current feeding to the coil pieces 403a is so made that the is direction of current in the coil pieces located within the magnetic field B1 is opposite to the direction of current in the other coil pieces located within the other magnetic field B2. Furthermore, the switching means 6a functions so that the direction of current fed to each coil piece 403a is changed in accordance with the stroke position of the suspension unit S.

The control circuit 6 carries out the control based on information signals from an acceleration sensor 8, the stroke sensor 7 and a load sensor 9. Similar to the aforementioned first embodiment, the acceleration sensor 8 is mounted on the vehicle body for detecting the vertical acceleration of the vehicle body. The vertical acceleration sensed is used for deriving a vertical speed of the vehicle body. The load sensor 9 senses a load applied to the suspension unit S. The load sensed is used for deriving the relative speed between the vehicle body and the road wheel. The arithmetic part of the control circuit 6 carried out a control to keep the vehicle posture constant based on the information signals from the stroke sensor 7 as well as a control to vary the damping force based on the information signals from the acceleration sensor 8 and the load sensor 9.

In FIG. 8, denoted by numeral 134 is a rebound stopper, 135 is a rebound rubber and 136 is a bumper rubber.

In the following, operation of the second embodiment will be described.

In practical use, the suspension unit S is arranged between the vehicle body and each of the road wheels, and the control circuit 6 and the sensors 7, 8 and 9 are used for each suspension unit S.

First, operation of the hydraulic damper P will be described.

Under contraction process of the suspension unit S, the upper chamber A is contracted and the lower chamber B is expanded. Accordingly, the fluid in the upper chamber A is forced to flow in the passage 121a of the piston 121 to open the damping valve 121c and flows through the passage 125a into the lower chamber B. Since the fluid flow between the upper and lower chambers A and B is restricted by the damping valve 121c, there is produced a damping force.

Furthermore, during the contraction process of the suspension unit S, the fluid in the upper chamber A by the amount corresponding to the volume of the piston rod 122 which is then inserted into the cylinder tube 111 is forced to flow through the passage 114a of the base member 114 to open the damping valve 114c and flow into the reservoir chamber C. Since the fluid flow between the chambers A and C is restricted by the damping valve 114c, there is produced a damping force.

Under expansion process of the suspension unit S, the lower chamber B is contracted and the upper chamber A is expanded. Accordingly, the fluid in the lower chamber B is forced to flow through the passage 125a and the passage 121b of the piston 121 to open the damping valve 121d and flow into the upper chamber A. Since the fluid flow between the lower and upper chambers B and A is restricted by the damping valve 121d, there is produced a damping force.

Furthermore, during the expansion process of the suspension unit S, the fluid in the reservoir chamber C by the amount corresponding to the volume of the piston rod 122 which is then drawn from the cylinder tube 111 is forced to flow through the passage 114a of the base member 114 to open the damping valve 114d and flow into the upper chamber A. Since the fluid flow between these chambers C and A is restricted by the damping valve 114d, there is produced a damping force.

In the following, operation of the electromagnetic actuator T will be described.

When it is needed to allow the suspension unit S to produce a damping force in accordance with a running condition of the vehicle, the coil pieces 3a are deenergized. With this, a damping force is produced in accordance with the relative speed between the body-connected structure 1 and the wheel-connected structure 2, that is, in proportion to the speed of the coil 403 which moves in the upper and lower magnetic field producing portions 302e and 302f. It is thus to be noted that in the control for the damping force, there is no need of feeding current to the coil 403. That is, the damping force is obtained without consuming electric power.

When it is needed to allow the suspension unit S to produce a driving force in order to achieve a vehicle posture control, the coil 403 is energized in accordance with the vehicle condition represented by information signals from the sensors 7, 8 and 9. That is, in accordance with the information signals from the sensors 7 to 9, the suspension unit S generates an upward or downward driving force in the direction of the axis of the unit S. the direction and intensity of the driving force are varied in accordance with the direction and intensity of current applied to the coil 403.

Thus, by generating such driving force in a direction to cancel the change of vehicle height, the vehicle height and the vehicle posture can be kept constant. Furthermore, by generating such driving force in a direction to cancel an external force applied to the unit S from the road wheel, the vehicle posture can be kept constant.

As described in the above, also in the second embodiment, the hydraulic damper P and the electromagnetic actuator T are arranged in parallel with each other. Thus, even when an abnormally bid impact force is applied to the suspension device, the device is prevented from being broken. Furthermore, because of the above-mentioned reasons, electric power consumption of the electromagnetic actuator T can be reduced.

Furthermore, because of the unique arrangement of the parts of the electromagnetic suspension device, it is no need of increasing the magnetic path even in a case wherein a larger stroke is required by the suspension unit S. Accordingly, irrespective of the degree of the stroke, a sufficient control force is obtained. Furthermore, because of the unique arrangement of the parts, compact mounting of the electromagnetic actuator T is obtained. This induces a compact construction of the suspension device.

Furthermore, since the power feeding is made to only some of the coil pieces 403a which are needed to produce the control force, electric power saving is achieved.

In the disclosed embodiment, as the stroke sensor 7 for sensing the stroke position of the suspension unit S, a magnetic flux sensor such as the Hall-effect sensor is used. Thus, the stroke position of the suspension unit S can be detected without increasing the basic length of the suspension unit S. This induces a compact construction of the suspension device.

Although the above-mentioned second embodiment is directed to an example wherein the magnetic path is produced by the upper and lower paired magnetic field producing portions, the magnetic path may be produced by only one pair of magnetic field producing portions.

What is claimed is:

1. An electromagnetic suspension device for use between a vehicle body and a road wheel, comprising:
   a body-connected structure connected to said vehicle body to move therewith;
   a wheel-connected structure connected to said road wheel to move therewith, said body-connected and wheel-connected structures being arranged to carry out a relative movement therebetween;
   an electromagnetic actuator associated with said body-connected and wheel-connected structures to electromagnetically control said relative movement in accordance with electric power applied thereto; and
   a hydraulic damper arranged in parallel with said electromagnetic actuator between said body-connected structure and said wheel-connected structure to produce a damping force in accordance with said relative movement, said hydraulic damper including:
   first, second and third tubes constituting a part of said body-connected structure, said first, second and third tubes being coaxially combined to define both a first cylindrical space between said first and second tubes and a second cylindrical space between said second and third tubes;
   means defining a larger space by an upper portion of said first tube, to which space an upper open part of said first cylindrical space is exposed, said larger space serving as a main reservoir chamber;
   means providing a communication between lower ends of said first and second cylindrical spaces;
   a fluid contained in said first and second cylindrical spaces, said main reservoir chamber and said third tube;
   a piston slidably and sealingly disposed in said third tube to divide the interior of said third tube into upper and lower chambers, said piston being connected to said wheel-connected structure through a piston rod; and
   a valve structure spacedly received in said main reservoir chamber and mounted on upper ends of said second and third tubes, said valve structure having a plurality of fluid control passages through which said upper chamber, said second cylindrical space and said main reservoir chamber are communicated in a controlled manner.

2. An electromagnetic suspension device as claimed in claim 1, in which said valve structure comprises:
   means for defining a first connecting passage which connects said upper chamber and said main reservoir chamber, said first connecting passage being provided with first and second damping valves which are opened only when the fluid flows from said upper chamber toward the main reservoir chamber;
   means for defining a second connecting passage which connects a middle part of said first connecting passage and said second cylindrical space;
   means for defining a first bypass passage which connects said upper chamber and said main reservoir chamber bypassing said first connecting passage, said first bypass passage being provided with an orifice;
   means for defining a second bypass passage which connects a middle part of said first bypass passage and a middle part of said first connecting passage, said second bypass passage being provided with an orifice;

means for defining a first check passage which connects said main reservoir chamber and said upper chamber, said first check passage being provided with a first check valve which is opened only when the fluid flows from said main reservoir chamber toward said upper chamber; and means for defining a second check passage which connects said main reservoir chamber and a middle part of said second connecting passage, said second check passage being provided with a second check valve which is opened only when the fluid flows from said main reservoir chamber toward said middle part of said second connecting passage.

3. An electromagnetic suspension device as claimed in claim 2, further comprising damping force varying means which varies the damping characteristics of said hydraulic damper.

4. An electromagnetic suspension device as claimed in claim 3, in which said damping force varying means comprises:

a cylindrical supporting pipe having two openings which respectively constitute parts of said first and second bypass passages of said valve structure;

a control spool sealingly and rotatably disposed in said supporting pipe and having said orifices of said first and second bypass passages formed in a cylindrical wall thereof, said orifices being mated with the openings of said cylindrical supporting pipe; and drive means for rotating said control spool about its axis thereby to vary the opening degree of said orifices relative to the openings of said supporting pipe.

5. An electromagnetic suspension device for use between a vehicle body and a road wheel, comprising:

a body-connected structure connected to said vehicle body to move therewith;

a wheel-connected structure connected to said road wheel to move therewith, said body-connected and wheel-connected structures being arranged to carry out a relative movement therebetween;

an electromagnetic actuator associated with said body-connected and wheel-connected structures to electromagnetically control said relative movement in accordance with electric power applied thereto; and a hydraulic damper arranged in parallel with said electromagnetic actuator between said body-connected structure and said wheel-connected structure to produce a damping force in accordance with said relative movement, said hydraulic damper including a fluid filed cylindrical chamber formed in said body-connected structure, a piston operatively disposed in said cylindrical chamber to divide the same into upper and lower chambers, said piston being connected through a piston rod to said wheel-connected structure, and a valve structure having a plurality of fluid control passages through which said upper and lower chambers are communicated, wherein said electromagnetic actuator includes:

upper and lower permanent magnet structures mounted to axially spaced portions of one of said body-connected and wheel-connected structures;

a coil connected to the other of said body-connected and wheel-connected structures near said upper and lower permanent magnet structures, so that upon occurrence of the relative movement between the body-connected and wheel-connected structures, said coil moves axially relative to said upper and lower permanent magnet structures; and control means for controlling electric power applied to said coil.

6. An electromagnetic suspension device as claimed in claim 5, in which each of said upper and lower permanent magnet structures comprises:

an outer annular permanent magnet coaxially and spacedly arranged around said coil; and an inner annular permanent magnet coaxially and spaced arranged in said coil.

7. An electromagnetic suspension device as claimed in claim 6, in which said coil comprises a plurality of coil pieces which are coaxially aligned, each coil piece being independently controlled by said control means.

8. An electromagnetic suspension device as claimed in claim 7, in which each coil piece has an axial length which is smaller than a distance between said upper and lower permanent magnet structures.

9. An electromagnetic suspension device as claimed in claim 8, in which the electric power feeding to each coil piece is made in accordance with information signals from a stroke sensor, an acceleration sensor and a load sensor which are mounted on the vehicle.

10. An electromagnetic suspension device as claimed in claim 9, further comprising damping force varying means for varying the damping characteristic of said hydraulic damper.

11. An electromagnetic suspension device as claimed in claim 10, in which said damping force varying means comprises:

a cylindrical supporting pipe having two openings which respectively constitute parts of two of said fluid control passages of the valve structure of said hydraulic damper;

a control spool sealingly and rotatably disposed in said supporting pipe and having two orifices, said orifices being mated with the openings of said supporting pipe respectively when said control spool assumes a certain angular position relative to said supporting pipe; and drive means for rotating said control spool thereby to vary the opening degree of said orifices relative to the openings of the supporting pipe.

* * * * *